US011620422B2

(12) United States Patent
Lu et al.

(10) Patent No.: US 11,620,422 B2
(45) Date of Patent: Apr. 4, 2023

(54) WATER SUPPLY SIMULATION METHOD AND TOOL FOR INTERLACED SYSTEM OF RIVER SYSTEM AND CANAL SYSTEM BASED ON GROUNDWATER MODEL

(71) Applicant: China Institute of Water Resources and Hydropower Research, Beijing (CN)

(72) Inventors: Chuiyu Lu, Beijing (CN); Qingyan Sun, Beijing (CN); Xin He, Beijing (CN); Lingjia Yan, Beijing (CN); Tao Qin, Beijing (CN); Jianhua Wang, Beijing (CN); Tianchen Li, Beijing (CN); Bo Zhang, Beijing (CN); Zepeng Li, Beijing (CN)

(73) Assignee: China Institute of Water Resources and Hydropower Research, Beijing (CN)

( * ) Notice: Subject to any disclaimer, the term of this patent is extended or adjusted under 35 U.S.C. 154(b) by 420 days.

(21) Appl. No.: 16/993,281

(22) Filed: Aug. 14, 2020

(65) Prior Publication Data
US 2021/0110091 A1 Apr. 15, 2021

(30) Foreign Application Priority Data
Oct. 15, 2019 (CN) .......................... 201910978310.3

(51) Int. Cl.
*G06F 30/28* (2020.01)
*G06F 17/16* (2006.01)
*G06F 113/08* (2020.01)
(52) U.S. Cl.
CPC ............. *G06F 30/28* (2020.01); *G06F 17/16* (2013.01); *G06F 2113/08* (2020.01)

(58) Field of Classification Search
CPC ...... G06F 30/28; G06F 17/16; G06F 2113/08; G01V 2210/661; G01V 99/005; G06Q 10/067; G06Q 50/06
See application file for complete search history.

(56) References Cited

U.S. PATENT DOCUMENTS

2005/0246102 A1* 11/2005 Patwardhan ........... A01G 25/16
702/2

OTHER PUBLICATIONS

Hossein Banejad et al., "Numerical Simulation of Groundwater Flow and Contamination Transport in Nahavand Plain Aquifer, West of Iran", Journal Geological Society of India, vol. 83, Jan. 2014, pp. 83-92 (Year: 2014).*

(Continued)

*Primary Examiner* — Steven W Crabb
(74) *Attorney, Agent, or Firm* — Bayramoglu Law Offices LLC (57) ABSTRACT

A water supply simulation method for interlaced system of river and canal system based on groundwater model, includes: S1. constructing simulated water conveyance channel based on first data, and performing attribute definition on water conveyance channels; S2. acquiring initial seepage, evaporation and discharge; S3. performing reverse water demand calculation; S4. performing sequential water supply simulation; S5. acquiring corresponding water head, obtaining current seepage, evaporation, discharge, head-end water demand and water consumption demand of each water conveyance channel based on water head; S6. judging whether current iteration is converged according to water head, if yes, proceeding to S7, otherwise returning to S3 after update; S7. judging whether there is next time period, if yes, returning to S3 after update, otherwise proceeding to S8; and S8. judging whether there is a next stress period, if yes, returning to S3 after update, otherwise outputting the result obtained in S5, and ending.

17 Claims, 3 Drawing Sheets

(56) References Cited

OTHER PUBLICATIONS

Michael G. McDonald et al., "A Modular Three-Dimensional Finitedifference Ground-Water Flow Model", U.S. Geological Survey, Open-File Report 83 875, 1984, 336 pages (Year: 1984).*

* cited by examiner

WATER SUPPLY SIMULATION METHOD AND TOOL FOR INTERLACED SYSTEM OF RIVER SYSTEM AND CANAL SYSTEM BASED ON GROUNDWATER MODEL

CROSS REFERENCE TO THE RELATED APPLICATIONS

This application is based upon and claims priority to Chinese Patent Application No. 201910978310.3, filed on Oct. 15, 2019, the entire contents of which are incorporated herein by reference.

TECHNICAL FIELD

The present invention relates to the technical field of hydrology and water resources, and in particular to a water supply simulation method and tool for an interlaced system of river system and canal system based on a groundwater model, and a computer-readable storage medium thereof.

BACKGROUND

At present, energy crisis has become increasingly serious worldwide, especially the crisis of water resources. Due to the rapid social and economic development in China, the demand for water is increasing, which facilitates the exploitation and utilization of water resources. With the increasingly sharp contradiction between the supply and demand of water resources, water supply and water consumption have become major issues in China. Especially in arid and semi-arid areas, the combined utilization of surface water and groundwater has become the main way to efficiently use water resources. However, the general groundwater numerical simulation software cannot determine the total water diversion of the canal head according to the water demand of the irrigation area.

SUMMARY

In view of the above deficiencies in the prior art, the present invention is intended to provide a water supply simulation method and tool for an interlaced system of river system and canal system based on a groundwater model, and a computer-readable storage medium, which can determine the total water diversion of the canal head according to the water demand of the irrigation area.

In order to achieve the above objective of the present invention, the present invention adopts the following technical solution.

A water supply simulation method for an interlaced system of river system and canal system based on a groundwater model, including:

S1. acquiring first data of a research area, constructing a simulated water conveyance channel for the interlaced system of river system and canal system based on the first data, and constructing a topology structure based on the simulated water conveyance channel, then performing attribute definition on all simulated water conveyance channels in the topology structure, and assigning initial values to a head-end water distribution of a head-end river channel and water demand of all the simulated water conveyance channels, wherein the simulated water conveyance channel includes a river channel and a canal channel;

S2. inputting the first data into MODFLOW software to obtain an initial seepage, an initial evaporation and an initial discharge of each simulated water conveyance channel, and setting the number of stress periods to 1 and the number of time periods to 1;

S3. performing a reverse water demand calculation based on the initial values of the water demand, the first data, the attribute definition, the seepage, the evaporation and the discharge to obtain a head-end water demand of a head-end canal channel and tail-end water distribution weights of all the simulated water conveyance channels;

S4. performing a sequential water supply simulation based on the water distribution weights, the initial value of the head-end water distribution of the head-end river channel and the head-end water demand of the head-end canal channel to obtain current seepage parameters, discharge parameters, evaporation parameters and water consumption parameters of all the simulated water conveyance channels;

S5. constructing a matrix equation according to the current seepage parameters, discharge parameters, evaporation parameters and water consumption parameters of all the simulated water conveyance channels to obtain corresponding water head, then obtaining current seepage, evaporation, discharge, head-end water demand and water consumption of each simulated water conveyance channel according to the water head and a water balance equation;

S6. judging whether a difference between a maximum value of the water head obtained after a current iteration and a maximum value of the water head obtained after a previous iteration is less than a set convergence index or not; and if yes, proceeding to step S7, otherwise, returning to step S3;

S7. incrementing the number of time periods by 1 and judging whether the number of current time periods is greater than a preset value of the number of time periods in the stress period or not, and if yes, setting the number of time periods to 1 and proceeding to step S8; otherwise, returning to step S3; and S8. incrementing the number of stress periods by 1, and judging whether the number of current stress periods is greater than a preset value of the number of stress periods or not, and if yes, outputting a result obtained from the water head and the water balance equation and ending, otherwise, returning to step S3.

Further, the attribute definition includes: number, upstream channel number, upstream channel inflow, downstream channel number, diversion channel number, water distribution attribute, diversion manner, head-end additional flow, diversion ratio, water consumption demand, water use manner, tail-end water demand, head-end water demand, head-end water diversion, calculated water level, seepage, evaporation and discharge.

Further, the reverse water demand calculation comprises:

S3.1. letting L=a, where a is a maximum value of the number;

S3.2. according to the attribute definition, judging whether the simulated water conveyance channel with the number L divides water from the upstream and automatically calculates the water distribution or not, and if yes, proceeding to step S3.3, otherwise, proceeding to step S3.7;

S3.3. according to the attribute definition, judging whether the present simulated water conveyance channel with the number L is a tail-end canal channel or not, and if not, calculating the tail-end water demand of the present simulated water conveyance channel and then proceeding to step S3.4, and if yes, proceeding to step S3.8;

S3.4. according to the attribute definition, judging whether the water usage way along the way of the present simulated water conveyance channel with the number L is tail-end water usage or not, and if yes, proceeding to step S3.5, otherwise, proceeding to step S3.9;

S3.5. calculating consumption along the way based on the initial value of the water consumption demand, the seepage, the evaporation and the discharge of the present simulated water conveyance channel with the number L, and then proceeding to step S3.6;

S3.6. calculating the head-end water demand of the present simulated water conveyance channel with the number L based on the tail-end water demand and the consumption along the way of the present simulated water conveyance channel with the number L, then calculating and updating the tail-end water distribution weight of the present simulated water conveyance channel with the number L, and then proceeding to step S3.7;

S3.7. judging whether L=1 is established or not, if yes, proceeding to step S3.10, otherwise, letting L=L−1 and then returning to step S3.2;

S3.8. calculating the head-end water demand of the present simulated water conveyance channel with the number L based on the initial value of the water consumption demand of the present simulated water conveyance channel with the number L, and then returning to step S3.7;

S3.9. calculating consumption along the way based on the initial value of the water consumption demand, the seepage, the evaporation and the discharge of the present simulated water conveyance channel with the number L, and then proceeding to step S3.6;

S3.10. based on the attribute definition, judging whether it is established that the present simulated water conveyance channel with the number L does not divide water from the upstream and does not automatically calculate the water distribution or not, and if yes, proceeding to step S3.11, otherwise, proceeding to step S3.12;

S3.11. based on the attribute definition, judging whether the tail end of the present simulated water conveyance channel with the number L automatically divides water to other simulated water conveyance channels or not, and if yes, calculating and updating the tail-end water distribution weight of the present simulated water conveyance channel with the number L according to the head-end water demand of the downstream simulated water conveyance channel of the present simulated water conveyance channel with the number L, and then proceeding to step S3.12, otherwise, proceeding to step S3.12; and S3.12. judging whether L=a is established or not, and if yes, ending; otherwise, letting L=L+1 and then returning to step S3.10.

Further, a calculation formula of the tail-end water demand of the simulated water conveyance channel with the number L is:

$$QSDO = \sum_{m=1}^{N} QNDI_m$$

where QSDO is the tail-end water demand of the simulated water conveyance channel with the number L, N is the number of downstream channels (N≥1); and $QNDI_m$ is head-end water demand of a m-th downstream channel.

Further, in step S3.5, a calculation formula of the consumption along the way is:

Qcon=Qwdm+Qleak+Qet−Qdrain where Qcon is the consumption along the way, Qwdm is the water consumption demand of the simulated water conveyance channel with the number L itself, Qleak is seepage of the simulated water conveyance channel with the number L itself, Qet is an evaporation loss of the simulated water conveyance channel with the number L itself, and Qdrain is discharge of groundwater toward the simulated water conveyance channel with the number L.

Further, in step S3.9, a calculation formula of the consumption along the way is:

$$Qcon = \sum_{c=1}^{n} \max\left\{0, \left(\frac{Qwdm}{n} + Qleak_c + Qet_c - Qdrain_c\right)\right\}$$

where Qcon is the consumption along the way, n is the total number of sections of the simulated water conveyance channel with the number L (n≥1), c is a c-th section of the simulated water conveyance channel with the number L (c≤n), Qwdm is the water consumption demand of the simulated water conveyance channel with the number L itself, $Qleak_c$ is seepage of the c-th section itself, $Qet_c$ is an evaporation loss of the c-th section itself, and $Qdrain_c$ is discharge of groundwater to the c-th section.

Further, in step S3.6, a calculation formula of the head-end water demand of the simulated water conveyance channel with the number L is:

QDI=QSDO+Qcon where QDI is the head-end water demand of the simulated water conveyance channel with the number L, QSDO is the tail-end water demand of the simulated water conveyance channel with the number L, and Qcon is the consumption along the simulated water conveyance channel with the number L.

Further, in step S3.8, a calculation formula of the head-end water demand of the simulated water conveyance channel with the number L is:

QDI=Qcon where QDI is the head-end water demand of the simulated water conveyance channel with the number L, and Qcon is the consumption along the way of the simulated water conveyance channel with the number L.

In a second aspect, a water supply simulation tool for an interlaced system of river system and canal system based on a groundwater model, including:

a receiving, constructing and assigning module for receiving first data of a research area, constructing a simulated water conveyance channel for the interlaced system of river system and canal system based on the first data, and constructing a topology structure based on the simulated water conveyance channel, then receiving attribute definitions of all simulated water conveyance channels, and assigning initial values to a head-end water distribution of a head-end river channel and water demand of all the simulated water conveyance channels, wherein the simulated water conveyance channel includes a river channel and a canal channel;

a first acquisition module for acquiring an initial seepage, an initial evaporation and an initial discharge of each simulated water conveyance channel according to the first data;

an initialization module for initializing the number of stress periods and the number of time periods;

a reverse water demand calculation module for performing a reverse water demand calculation based on the initial values of the water demand, the first data, the attribute definition, the seepage, the evaporation and the discharge to obtain a head-end water demand of a head-end canal channel and tail end water distribution weights of all simulated water conveyance channels when the number of current time periods is less than or equal to a preset value of the number of time periods in the stress period and the number of current stress periods is less than or equal to a preset value of the number of stress periods;

a sequential water supply simulation module for performing a sequential water supply simulation based on the water distribution weights, the initial value of the head-end water distribution of the head-end river channel and the head-end water demand of the head-end canal channel to obtain current seepage parameters, discharge parameters, evaporation parameters and water consumption parameters of all the simulated water conveyance channels;

a second acquisition module for constructing a matrix equation to obtain corresponding water head according to the current seepage parameters, discharge parameters, evaporation parameters and water consumption parameters of all the simulated water conveyance channels, and obtaining current seepage, evaporation, discharge, head-end water demand and water consumption of each simulated water conveyance channel according to the water head and a water balance equation;

a convergence judgment module for judging whether a current iteration is converged or not according to the water head;

an update module for updating the seepage, evaporation and discharge of each simulated water conveyance channel;

a time period and stress period counting judgment module for incrementing the number of time periods by 1 each time the convergence judgment module judges that the result is converged, and judging whether the number of current time periods is greater than the preset value of the number of time periods in the stress period or not, and if yes, setting the number of time periods to 1 and then incrementing the number of stress periods by 1, and judging whether the number of current stress periods is greater than the preset value of the number of stress periods or not; and an output module for outputting a result obtained from the water head and the water balance equation when the number of current stress periods is greater than the preset value of the number of stress periods.

In a third aspect, provided is a computer-readable storage medium storing a computer program thereon, which when executed by a processor implements the water supply simulation method provided in the present solution.

The advantages of the present invention are as follows.

In the present invention, first, the reverse water demand calculation accumulates step by step the initial values of the water consumption demand of all the simulated water conveyance channels in canal system to the canal head (head-end canal channel) through the canal system, and calculates the head-end water demand of the head-end canal channel and tail-end water distribution weights of all simulated water conveyance channels; second, in the sequential water supply simulation, sequential water supply simulation is performed on the basis of the initial value of the head-end water distribution of the head-end river channel and the water distribution weights and the head-end water demand of the head-end canal channel obtained by the present reverse water demand calculation, so as to obtain the current seepage parameters, discharge parameters, evaporation parameters and water consumption parameters of all the simulated water conveyance channels; at last, based on the seepage parameters, discharge parameters, evaporation parameters and water consumption parameters, a matrix equation is constructed to obtain the water head for judging whether the simulation result is converged or not.

Specifically, when the simulation result is not converged, and the next stress period or the next period begins, the next reverse water demand calculation is performed. In the next reverse water demand calculation, on the basis of the initial values of water demand, in conjunction with the seepage, evaporation, and discharge obtained by the previous water supply simulation, the reverse water demand calculation is performed to achieve the iterative loop of reverse water demand calculation and sequential water supply simulation. Moreover, based on the water head and the water balance equation, the current seepage, evaporation, discharge, head-end water demand and water consumption of each simulated water conveyance channel are obtained. Furthermore, the head-end water demand of the final head-end canal channel is the water diversion of the canal head.

Through the iterative loop of reverse water demand calculation and sequential water supply simulation, the automatic calculation of the head-end water demand of the head-end canal channel is realized, setting of the water distribution weight relationship at each node of the river channel and the canal channel is completed, automatic water distribution is realized, the amount of water of the river channel is reasonably distributed to each simulated water conveyance channel, and the water supply simulation of the canal system is realized.

DETAILED DESCRIPTION OF THE EMBODIMENTS

The specific implementations of the present invention will be described in detail below with reference to the drawings, so that those skilled in the art can understand the present invention. However, it should be understood that the embodiments described below are only a part of the embodiments of the present invention, but not all the embodiments. Without departing from the spirit and scope of the present invention as defined and determined by the appended claims, all other embodiments obtained by those skilled in the art without any creative effort shall fall within the protection scope of the present invention.

Figure 1:
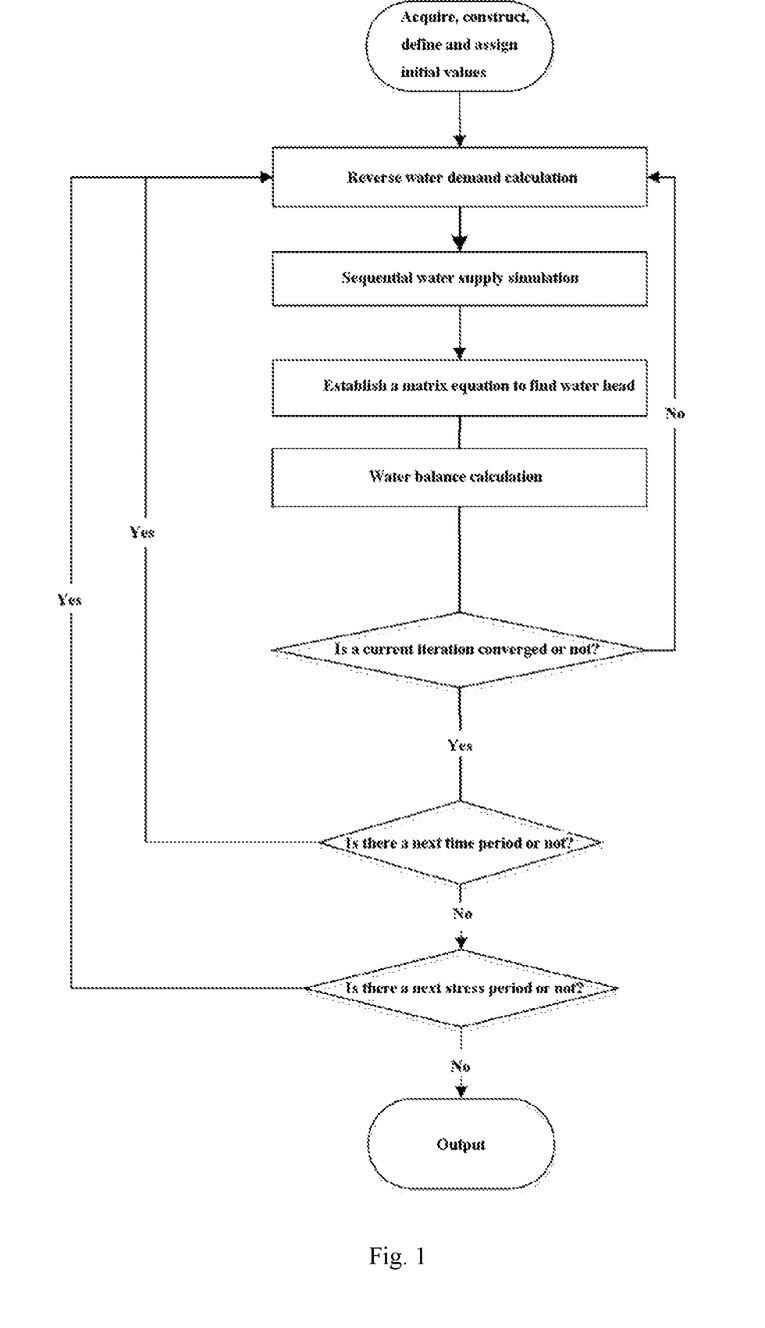
FIG. 1 is a flowchart of the present invention in a specific embodiment.

As shown in FIG. 1, a water supply simulation method for an interlaced system of river system and canal system based on groundwater model includes the following steps.

S1. Acquiring first data of a research area, constructing simulated water conveyance channels for the interlaced system of the river system and the canal system based on the first data and constructing a topology structure based on the simulated water conveyance channels, then performing attribute definition of all simulated water conveyance channels in the topology structure, and assigning initial values to head-end water distribution of a head-end river channel and water consumption demand of all simulated water conveyance channels, in which the simulated water conveyance channel comprises river channels and canal channels.

Figure 2:
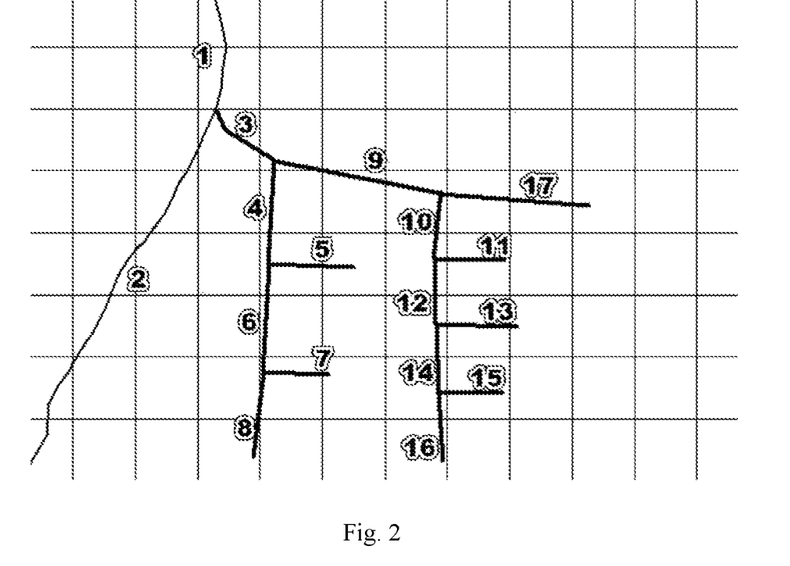
FIG. 2 is a distribution diagram of an interlaced system of river system and canal system in a specific application example.

As shown in FIG. 2, numbers 1 and 2 are river channels, numbers 3 to 17 are river channels, number 1 is a head-end river channel, and numbers 5, 7, 8, 11, 13, 15, 16, and 17 are tail-end canal channels.

Specifically, the attribute definition of the simulated water conveyance channel includes: number, upstream channel number, upstream channel inflow, downstream channel number, diversion channel number, water distribution attribute, diversion manner, head-end additional flow, diversion ratio, water consumption demand, water use manner, tail-end water demand, head-end water demand, head-end water diversion, calculated water level, seepage, evaporation and discharge. Their table form is shown in Table 1:

TABLE 1

| Data Information | Meaning |
| --- | --- |
| Simulated water conveyance channel number | It indicates an ID number of the present simulated water conveyance channel, starting from number 1 (generally a downstream channel's number is greater than an upstream channel's number) |
| Upstream channel number | It refers to an upstream channel number of the present simulated water conveyance channel |
| Upstream channel inflow | It indicates a flow from an upstream channel to the present channel |
| Downstream channel number | It refers to a downstream channel number of the present channel, and a value of −1 indicates there is no downstream channel |
| Diversion channel number | It indicates that the present channel divides water from a tail end of a set channel; and a value of −1 indicates that the simulated water conveyance channel will not divide from other channels, and the divided channel and the upstream channel are independent with each other. |
| Water distribution attribute | It refers to the statue of calculation of the water distribution of the current simulated water conveyance channel from other channels. A value of 0 indicates that the water distribution is a value inputted by a user; and a value of 1 indicates that the water distribution is uncertain and the water distribution is automatically calculated. (Indicate whether it is a canal channel or a river channel) |
| Diversion manner | It refers to the manner in which the simulated water conveyance channel diverts from other channels. A value of 0 indicates that the flow is divided according to a flow specified by the user, and the divided flow is a head-end additional flow value of the present simulated water conveyance channel; and a value of 1 indicates that the flow is divided according to the proportion of water distribution |
| Head-end additional flow | It indicates an additional incoming flow at the head end of the present simulated water conveyance channel or a flow value (L3/T) divided from other channels. The parameter is invalid for channels where the water distribution is automatically calculated |
| Diversion ratio | It refers to a ratio of a flow rate of the present simulated water conveyance channel divided from other channels to a tail-end flow of the channel. The valid value range is 0.0 to 1.0. If the total ratio of all flows divided from the tail end of the channel is greater than 1.0, then the diversion ratio of each channel will be automatically re-adjusted |
| Water consumption demand | The water used in the channel is considered to be consumed and no longer participates in the circulation of the river network (unless it is not used for irrigation, but is discharged to the downstream channel). The channel where the water distribution is automatically calculated will use the data to calculate the water diversion from other channels needed at the head end of the simulated water conveyance channel. |

TABLE 1-continued

| Data Information | Meaning |
| --- | --- |
| Water use manner | It refers to a water use manner of the channel. A value of 0 indicates that the water consumption is evenly distributed on each section of the channel; and a value of 1 indicates that the water is led from the end of the channel to other places |
| Tail-end water demand | It refers to water distribution of the present simulated water conveyance channel to the downstream channels, and is also equal to a sum of the head-end water demand of all downstream channels |
| Head-end water demand | It refers to an algebraic sum between tail-end water demand of the present simulated water conveyance channel, recharge, consumption, and upstream channel inflow |
| Head-end water diversion | It refers to an amount of water that needs to be drawn from the upstream channels, which is usually equal to the head-end water demand |
| Calculation of water level | 1 indicates that the present channel automatically calculates the water level according to the Manning formula, and 0 indicates that the water level is specified by the user |
| Seepage | Amount of water seepage from the present simulated water conveyance channel to groundwater |
| Evaporation | Amount of water lost in the present simulated water conveyance channel due to evaporation |
| Discharge | Amount of groundwater discharged into the present simulated water conveyance channel |

S2. Inputting the first data into MODFLOW software to obtain initial seepage, initial evaporation and initial discharge of each simulated water conveyance channel, and setting the number of stress periods to 1 and the number of time periods to 1.

S3. Performing reverse water demand calculation based on the initial values of the water consumption demand, the first data, the attribute definition, the seepage, the evaporation and the discharge to obtain head-end water demand of a head-end canal channel and tail end water distribution weights of all simulated water conveyance channels.

Figure 3:
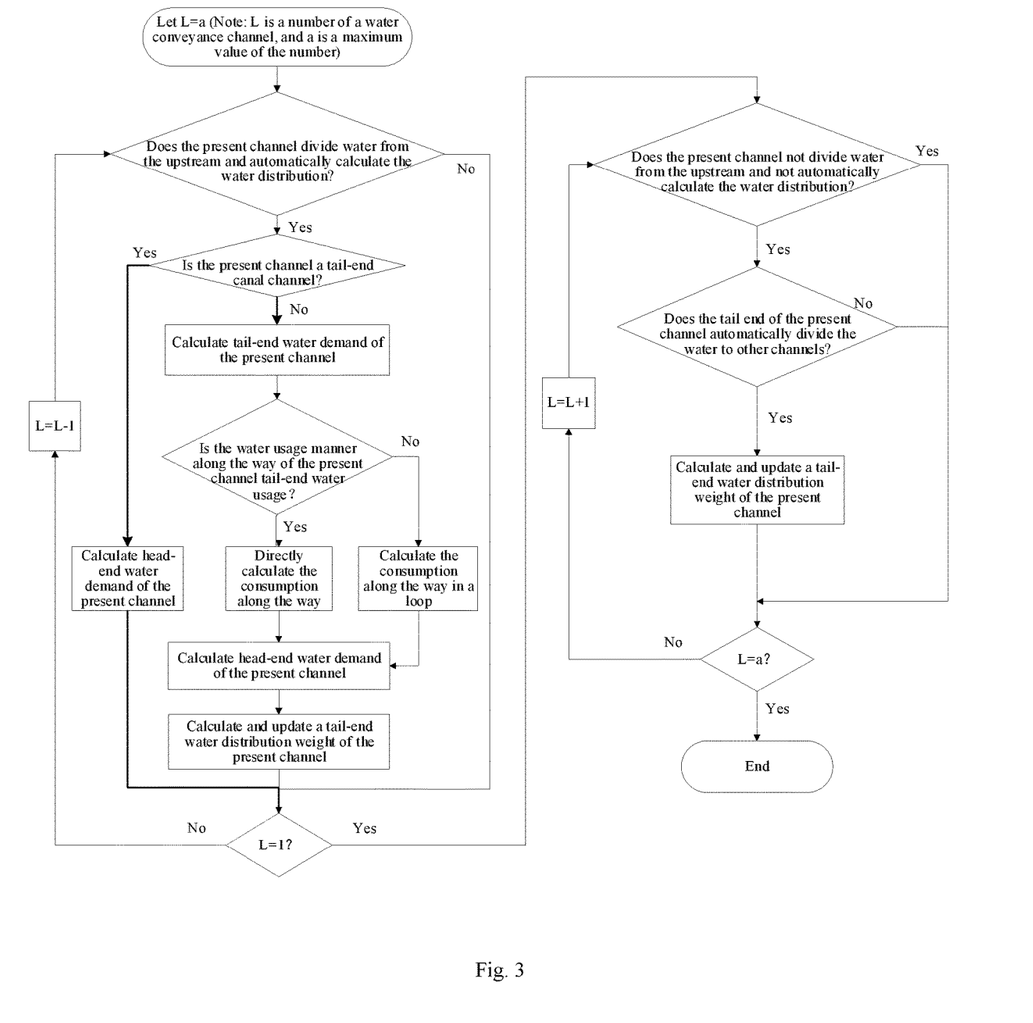
FIG. 3 is a flowchart of reverse water demand calculation of FIG. 1.

Specifically, the reverse water demand calculation is gradually superimposed from the tail-end canal channel to the head-end river channel. As shown in FIG. 3, the reverse water demand calculation comprises: steps 3.1-3.9, which are a reverse calculation process of calculating the canal system (including reverse superposition to obtain the head-end water demand and setting of a water distribution weight of each canal channel (i.e. an automatic water distribution weight)); and taking FIG. 2 as an example, steps 3.10-3.12, which are to set (automatic) water distribution weights at the simulated water conveyance channel nodes Nos. 1, 2 and 3 (which is actually defined on the basis of the head-end water demand of the simulated water conveyance channel No. 3 (the head-end canal channel)), thereby ensuring that the head-end water distribution of the head-end canal channel in the sequential water supply simulation is the head-end water demand of the head-end canal channel obtained by the latest reverse water demand calculation.

S3.1. Letting L=a, where a is a maximum value of the number.

S3.2. According to the attribute definition, judging whether the simulated water conveyance channel with the number L divides water from the upstream and automatically calculates the water distribution or not, and if yes, proceeding to step S3.3, otherwise, proceeding to step S3.7.

S3.3. According to the attribute definition, judging whether the present simulated water conveyance channel with the number L is a tail-end canal channel or not, and if it is not, calculating the tail-end water demand of the present simulated water conveyance channel and then proceeding to step S3.4, and if it is, proceeding to step S3.8.

Specifically, a calculation formula of the tail-end water demand of the simulated water conveyance channel with the number L is:

$$QSDO = \sum_{m=1}^{N} QNDI_m$$

where QSDO is the tail-end water demand of the simulated water conveyance channel, N is the number of downstream channels (N≥1); and $QNDI_m$ is head-end water demand of a m-th downstream channel.

S3.4. According to the attribute definition, judging whether the water usage method along the way of the present simulated water conveyance channel with the number L is tail-end water use or not, and if it is, proceeding to step S3.5, otherwise, proceeding to step S3.9. The water usage manner includes tail-end water usage (indicating that there is no water usage along the way of the present simulated water conveyance channel, and only water is taken at the tail end) and even water usage along the way (indicating that there is water usage along the way).

During the initial reverse water demand calculation, the seepage, evaporation and discharge are the initial seepage, initial evaporation and initial discharge obtained after the first data is input into the MODFLOW software.

S3.5. Calculating consumption along the way based on the initial value of the water consumption demand, the seepage, the evaporation and the discharge of the present simulated water conveyance channel with the number L, and then proceeding to step S3.6.

Specifically, a calculation formula of the consumption along the way is:

Qcon=Qwdm+Qleak+Qet−Qdrain where Qcon is the consumption along the way, Qwdm is an initial value of the water consumption demand of the simulated water conveyance channel itself, Qleak is seepage of the simulated water conveyance channel itself, Qet is an evaporation loss of the simulated water conveyance channel itself, and Qdrain is discharge of groundwater toward the simulated water conveyance channel. It indicates that during the tail-end water use, the consumption along the way is an algebraic sum between the recharge of the simulated water conveyance channel (the discharge of groundwater into the simulated water conveyance channel) and the consumption.

S3.6. Calculating the head-end water demand of the present simulated water conveyance channel with the number L based on the tail-end water demand and the consumption along the way of the present simulated water conveyance channel with the number L, then calculating and updating the tail-end water distribution weight of the present simulated water conveyance channel, and then proceeding to step S3.7.

Specifically, a calculation formula of the head-end water demand of the simulated water conveyance channel is:

QDI=QSDO+Qcon where QDI is the head-end water demand of the simulated water conveyance channel, QSDO is the tail-end water demand of the simulated water conveyance channel, and Qcon is the consumption along the simulated water conveyance channel.

Specifically, a calculation formula of the water distribution weight is as follows:

$\beta_j = QNDI_j/QSDO$, $QSDO < 1e^{-30}$ $\beta_j = QSDO/N$, $QSDO \leq 1e^{-30}$ where QSDO indicates the tail-end water demand of the simulated water conveyance channel; N is the number of downstream simulated water conveyance channels (N≥1); j indicates a j-th downstream channel (j≤N); $QNDI_j$ indicates the head-end water demand of the j-th downstream channel; and $\beta_j$ indicates the water distribution ratio weight of the j-th downstream channel. The above formula indicates that the setting of the water distribution weight is adjusted according to the size of the tail-end water distribution. When the tail-end water demand is greater than $1e^{-30}$, the weight of the water distribution is set according to the water demand ratio of the downstream channels; when the water demand is too small, the weight is evenly distributed.

S3.7. Judging whether L=1 is established or not, if it is, proceeding to step S3.10, otherwise, let L=L−1 and then returning to step S3.2. When the judgment result in the step is yes, the head-end water demand of all simulated water conveyance channels (including the head-end water demand of the head-end canal channel) is obtained.

S3.8. Calculating the head-end water demand of the present simulated water conveyance channel with the number L based on the initial value of the water consumption demand of the present simulated water conveyance channel, and then returning to step S3.7.

Specifically, a calculation formula of the head-end water demand of the simulated water conveyance channel is:

QDI=Qcon where QDI is the head-end water demand of the simulated water conveyance channel, and Qcon is the consumption along the way of the simulated water conveyance channel. The consumption Qcon along the way in the step is consistent with the calculation method of the consumption Qcon along the way in steps S3.5 and S3.9. The above formula actually shows that when calculating the head-end water demand of the tail-end canal channel, its tail-end water demand is taken as 0, because the initial value of the water consumption demand of the tail-end canal channel already includes its actual tail-end water demand.

S3.9. Calculating the consumption along the way based on the initial value of the water consumption demand, the seepage, the evaporation and the discharge of the present simulated water conveyance channel with the number L, and then proceeding to step S3.6.

In which, a calculation formula of the consumption along the way is:

$$Qcon = \sum_{c=1}^{n} \max\left\{0, \left(\frac{Qwdm}{n} + Qleak_c + Qet_c - Qdrain_c\right)\right\}$$

where Qcon is the consumption along the way, n is the total number of sections of the simulated water conveyance channel (n≥1); c is a c-th section of the simulated water conveyance channel (c≤n), Qwdm is an initial value of the water consumption demand of the simulated water conveyance channel itself, $Qleak_c$ is seepage of the c-th section itself, $Qet_c$ is an evaporation loss of the c-th section itself, and $Qdrain_c$ is discharge of groundwater to the c-th section. It indicates that during the non-tail-end water usage, the consumption along the way is equally an algebraic sum between the recharge of the present simulated water conveyance channel (the discharge of groundwater into the present simulated water conveyance channel) and the consumption. The difference is that the consumption along the way at this time is accumulated step by step. The present calculation method evenly distributes the water consumption demand to each section, then calculates the consumption along the way of each section, and finally accumulates the consumption along the way of each section to obtain the total consumption along the way of the present simulated water conveyance channel.

S3.10. Based on the attribute definition, judging whether it is established that the present simulated water conveyance channel with the number L does not divide water from the upstream and does not automatically calculate the water distribution or not, and if it is, proceeding to step S3.11, otherwise, proceeding to step S3.12. When the judgment result is yes, it shows that the present simulated water conveyance channel represents all the river channels. Taking FIG. 2 as an example, it indicates simulated water conveyance channels 1 and 2.

S3.11. Based on the attribute definition, judging whether the tail end of the present simulated water conveyance channel with the number L automatically divides water to other simulated water conveyance channels or not, and if it is, calculate and update the tail-end water distribution weight of the present simulated water conveyance channel according to the head-end water demand of a downstream simulated water conveyance channel of the present simulated water conveyance channel, and then proceeding to step S3.12, otherwise, proceeding to step S3.12. When the judgment result is yes, it shows that the present simulated water conveyance channel is a river channel where the water is divided into the canal channels. Moreover, taking FIG. 2 as an example, it shows that it is channel 1.

S3.12. Judging whether L=a is established or not, and if it is, ending; otherwise, letting L=L+1 and then returning to step S3.10.

S4. Performing sequential water supply simulation based on the water distribution weights, the initial value of the head-end water distribution of the head-end river channel and the head-end water demand of the head-end canal channel to obtain current seepage parameters, discharge parameters, evaporation parameters and water consumption parameters of all simulated water conveyance channels. Sequential water supply simulation means that the head-end river channel is diverted step by step backwards. It refers to the process of distributing the actual water supply step by step from the head-end canal channel and performing coupling simulation of groundwater and surface water. According to the flow obtained from each simulated water conveyance channel, the recharge (the discharge of groundwater into the simulated water conveyance channel) and consumption (evaporation, seepage and water consumption) of the simulated water conveyance channel are calculated and updated.

Calculation formulae of the seepage flow parameter and the discharge volume parameter are:

QRIV=CRIV (HRIV−RBOT), $h_{i,j,k}$≤RBOT≤HRIV

QRIV=CRIV (HRIV−$h_{i,j,k}$), HRIV≥$h_{i,j,k}$>RBOT wherein when QRIV is positive, it indicates seepage, which means that the water flows from the simulated water conveyance channel to the aquifer; when QRIV is negative, it indicates discharge, which means that the water flow is discharged from the aquifer to the simulated water conveyance channel; CRIV is hydraulic conductivity of interconnection of the simulated water conveyance channel and the aquifer; $h_{i,j,k}$ is water head of an unit where the simulated water conveyance channel is located; RBOT is elevation at the base of the simulated water conveyance channel; and HRIV is a water level in the simulated water conveyance channel.

The evaporation parameter is calculated by using a water surface evaporation formula:

ETp=αwd where ETp is potential evaporation, a is evaporation intensity, w is a width of the simulated water conveyance channel, and d is a length of the simulated water conveyance channel. The potential evaporation is calculated by the above formula, and the minimum value between the actual flow and evaporation of the current simulated water conveyance channel is selected as the actual evaporation ETa of the simulated water conveyance channel.

The water consumption parameter is the maximum value of the "canal channel flow after the seepage and the evaporation are deducted" and the "water consumption demand".

In addition, the calculation methods of the evaporation parameter, the seepage parameter, the discharge parameter and the water consumption parameter in the existing MODFLOW software can also be used to calculate the evaporation parameter, the seepage parameter, the discharge parameter and the water consumption parameter.

S5. Constructing a matrix equation according to the current seepage parameters, discharge parameters, evaporation parameters and water consumption parameters of all simulated water conveyance channels to obtain corresponding water head, then obtaining current seepage, evaporation, discharge, head-end water demand and water consumption of each simulated water conveyance channel according to the water head and a water balance equation.

As for the calculation of the corresponding water head, it can specifically be as follows: the finite difference simulation software of the central unit is used to write a difference equation based on the water balance for each calculation unit in the simulated water conveyance channel according to the groundwater dynamics equation (except for the invalid calculation unit or the constant water head calculation unit). The difference equation is as follows:

$$CV_{i,j,k-\frac{1}{2}} h^m_{i,j,k-1} + CC_{i-\frac{1}{2},j,k} h^m_{i-1,j,k} +$$
$$CR_{i,j-\frac{1}{2},k} h^m_{i,j-1,k} + \left(-CV_{i,j,k-\frac{1}{2}} - CC_{i-\frac{1}{2},j,k} - CR_{i,j-\frac{1}{2},k} -\right.$$
$$\left. CR_{i,j+\frac{1}{2},k} - CC_{i+\frac{1}{2},j,k} - CV_{i,j,k+\frac{1}{2}} + HCOF_{i,j,k}\right) h^m_{i,j,k} +$$
$$CR_{i,j+\frac{1}{2},k} h^m_{i,j+1,k} + CC_{i+\frac{1}{2},j,k} h^m_{i+1,j,k} + CV_{i,j,k+\frac{1}{2}} h^m_{i,j,k+1} = RHS_{i,j,k}$$

in the above formula, CV, CC, and CR are hydraulic conductivity coefficients; i, j, and k are cell numbers; m is a period number; h is a water head; and HCOF and RHS are differential terms.

Moreover, the seepage parameter is substituted into the HCOF difference term of the above difference equation, and the evaporation and water consumption parameters are substituted into the RHS difference term. These difference equations are solved simultaneously for the water head h. Due to the excessive number of linear equations, it is expressed in the form of a matrix as: [A]{h}={q}. The matrix equation is used to solve for the water head h, and then the maximum value of the water head h is obtained.

The water flow balance in and out of a channel section can be calculated using the equation below:

$$QIN - QOUT = Qwdm + Qleak + Qet$$

Qwdm is a channel's own water consumption; Qleak is the channel's own seepage; Qet is the channel's own evaporation loss; QIN is actual inflow at the head end of the simulated water conveyance channel; and QOUT is actual outflow. The actual inflow at the head end includes a total inflow and sub-flow/additional flow of each upstream channel.

S6. Judging whether a difference between a maximum value of the water head obtained after a current iteration and a maximum value of the water head obtained after a previous iteration is less than a set convergence index or not; and if it is, proceeding to step S7, otherwise, returning to step S3.

S7. Incrementing the number of time periods by 1 and judging whether the number of current time periods is greater than a preset value of the number of time periods in the stress period or not, and if it is, setting the number of time periods to 1 and proceeding to step S8; otherwise, returning to step S3.

S8. Incrementing the number of stress periods by 1, and judging whether the number of current stress periods is greater than a preset value of the number of stress periods or not, and if it is, outputting a result obtained from the water head and the water balance equation and end, otherwise, returning to step S3.

The present solution is obtained based on the improvement of MODFLOW software. The core of the present solution is to design an iterative loop for reverse water demand calculation and sequential water supply simulation, and nest the iterative loop into the stress period simulation and time period simulation loop.

In specific application examples, the simulation results are shown in Table 2 below.

conveyance channels 5, 7, 8, 11, 13, 15, 16, 17 are met, so that the water in the river channel can be reasonably distributed onto each unit grid. The smaller water balance error shows that each simulated water conveyance channel has achieved dynamic balance of water input and output. The tail-end outflow of the terminal simulated water conveyance channel is 0, which shows that the present invention can complete the field water supply simulation more accurately according to the water demand distribution scheme.

In a second aspect, the present disclosure provides a water supply simulation tool for an interlaced system of river system and canal system based on a groundwater model, including:

a receiving, constructing and assigning module for receiving first data of a research area, constructing a simulated water conveyance channel for the interlaced system of river system and canal system based on the first data and constructing a topology structure based on the simulated water conveyance channel, then receiving an attribute definition of all simulated water conveyance channels, and assigning initial values to head-end water distribution of a head-end river channel and water consumption demand of all the simulated water conveyance channels, in which the simulated water conveyance channel includes a river channel and a canal channel;

a first acquisition module for acquiring initial seepage, initial evaporation and initial discharge of each simulated water conveyance channel according to the first data;

an initialization module for initializing the number of stress periods and the number of time periods;

a reverse water demand calculation module for performing reverse water demand calculation based on the initial values of the water consumption demand, the first data, the attribute definition, the seepage, the evaporation and the discharge to obtain head-end water demand of a head-end canal channel and tail end water distribution weights of all simulated water conveyance channels when the number of

TABLE 2

| Water supply channel number | Head-end inflow ($m^3$) | Seepage ($m^3$) | Evaporation ($m^3$) | Water consumption ($m^3$) | Tail-end outflow ($m^3$) | Water balance error |
|---|---|---|---|---|---|---|
| 1  | 43835.61644 | 5031.572116 | 234.1841492 | 0    | 38569.86017 | 0 |
| 2  | 9565.386354 | 9105.519723 | 459.8666304 | 0    | 0           | 0 |
| 3  | 29004.47382 | 479.8192023 | 24.90733862 | 0    | 28499.74728 | 0 |
| 4  | 7907.559607 | 533.8196429 | 32.58708473 | 0    | 7341.15288  | 0 |
| 5  | 3192.537096 | 395.1515204 | 26.38557585 | 2771 | 0           | 0 |
| 6  | 4148.615783 | 513.679094  | 32.94755568 | 0    | 3601.989134 | 0 |
| 7  | 1681.310868 | 299.0424232 | 20.26844493 | 1362 | 0           | 0 |
| 8  | 1920.678266 | 384.4166083 | 26.26165727 | 1510 | 0           | 0 |
| 9  | 20592.18767 | 952.139127  | 52.17789055 | 0    | 19587.87065 | 0 |
| 10 | 17993.44616 | 368.4820625 | 20.52623247 | 0    | 17604.43786 | 0 |
| 11 | 5447.126567 | 332.0370061 | 22.08956114 | 5093 | 0           | 0 |
| 12 | 12157.31129 | 343.2090875 | 20.04887121 | 0    | 11794.05333 | 0 |
| 13 | 7191.951631 | 390.8013259 | 25.15030511 | 6776 | 0           | 0 |
| 14 | 4602.101703 | 336.8252159 | 21.42419658 | 0    | 4243.852291 | 0 |
| 15 | 3099.684881 | 289.9735993 | 19.71128166 | 2790 | 0           | 0 |
| 16 | 1144.16741  | 300.4055679 | 20.76184188 | 823  | 0           | 0 |
| 17 | 1594.424499 | 671.4130661 | 46.01143255 | 877  | 0           | 0 |

The above table shows that according to the water demand at the end of the field, the present invention completes the automatic setting of the water distribution weights at each node of the river channel and the canal channel. The total water diversion of canal head 3 is 29005 $m^3$. After the evaporation and seepage along the way are deducted, the field water consumption demand of the field simulated water current time periods is less than or equal to a preset value of the number of time periods in the stress period and the number of current stress periods is less than or equal to a preset value of the number of stress periods;

a sequential water supply simulation module for performing sequential water supply simulation based on the water distribution weights, the initial value of the head-end water distribution of the head-end river channel and the head-end water demand of the head-end canal channel to obtain current seepage parameters, discharge parameters, evaporation parameters and water consumption parameters of all the simulated water conveyance channels;

a second acquisition module for constructing a matrix equation to obtain corresponding water head according to the current seepage parameters, discharge parameters, evaporation parameters and water consumption parameters of all the simulated water conveyance channels, and obtaining current seepage, evaporation, discharge, head-end water demand and water consumption of each simulated water conveyance channel according to the water head and a water balance equation;

a convergence judgment module for judging whether a current iteration is converged or not according to the water head;

an update module for updating the seepage, evaporation and discharge of each simulated water conveyance channel;

a time period and stress period counting judgment module for incrementing the number of time periods by 1 each time the convergence judgment module judges that the result is converged, and judging whether the number of current time periods is greater than the preset value of the number of time periods in the stress period or not, and if it is, setting the number of time periods to 1 and then incrementing the number of stress periods by 1, and judging whether the number of current stress periods is greater than the preset value of the number of stress periods or not; and an output module for outputting a result obtained from the water head and the water balance equation when the number of current stress periods is greater than the preset value of the number of stress periods.

In a third aspect, the present disclosure provides a computer-readable storage medium storing a computer program thereon, which when executed by a processor implements the water supply simulation method designed by the present disclosure.

What is claimed is:

1. A water supply simulation method for an interlaced system of river system and canal system based on a groundwater model, comprising:
   S1, acquiring first data of a research area, constructing a plurality of simulated water conveyance channels for the interlaced system of river system and canal system based on the first data, and constructing a topology structure based on the plurality of simulated water conveyance channels, then performing an attribute definition on each simulated water conveyance channel of the plurality of simulated water conveyance channels in the topology structure, and assigning an initial value to a head-end water distribution of a head-end river channel and an initial value to a water consumption demand of the each simulated water conveyance channel, wherein the each simulated water conveyance channel comprises a river channel and a canal channel;
   S2, inputting the first data into groundwater flow model software to obtain an initial seepage, an initial evaporation and an initial discharge of the each simulated water conveyance channel, and setting a number of stress periods to 1 and a number of time periods to 1;
   S3, performing a reverse water demand calculation based on the initial value of the water consumption demand, the first data, the attribute definition, the initial seepage, the initial evaporation and the initial discharge to obtain a head-end water demand of a head-end canal channel and tail end water distribution weights of the plurality of simulated water conveyance channels;
   S4, performing a sequential water supply simulation based on the tail end water distribution weights, the initial value of the head-end water distribution of the head-end river channel and the head-end water demand of the head-end canal channel to obtain current seepage parameters, current discharge parameters, current evaporation parameters and current water consumption parameters of the plurality of simulated water conveyance channels;
   S5, constructing a matrix equation according to the current seepage parameters, the current discharge parameters, the current evaporation parameters and the current water consumption parameters of the plurality of simulated water conveyance channels to obtain a corresponding water head, then obtaining a current seepage, a current evaporation, a current discharge, a current head-end water demand and a current water consumption of the each simulated water conveyance channel according to the water head and a water balance equation;
   S6, judging whether a difference between a maximum value of the water head obtained after a current iteration and a maximum value of the water head obtained after a previous iteration is less than a set convergence index or not; and if the difference is less than the set convergence index, proceeding to step S7, and if the difference is not less than the set convergence index, returning to step S3;
   S7, incrementing the number of the time periods by 1 and judging whether the number of current time periods is greater than a preset value of the number of the time periods in the stress periods or not, and if the number of the current time periods is greater than the preset value of the number of the time periods in the stress periods, setting the number of the time periods to 1 and proceeding to step S8; and if the number of the current time periods is not greater than the preset value of the number of the time periods in the stress periods, returning to step S3; and
   S8, incrementing the number of the stress periods by 1, and judging whether the number of current stress periods is greater than a preset value of the number of the stress periods or not, and if the number of the current stress periods is greater than the preset value of the number of the stress periods, outputting a result obtained from the water head and the water balance equation and ending, and if the number of the current stress periods is not greater than the preset value of the number of the stress periods, returning to step S3.

2. The water supply simulation method of claim 1, wherein, the attribute definition comprises: a system number, an upstream channel number, an upstream channel inflow, a downstream channel number, a diversion channel number, a water distribution attribute, a diversion manner, a head-end additional flow, a diversion ratio, a water consumption demand, a water usage manner, a tail-end water demand, a head-end water demand, a head-end water diversion, a calculated water level, a seepage, an evaporation and a discharge.

3. The water supply simulation method of claim 2, wherein, the reverse water demand calculation comprises:
   S3.1, letting L=a, wherein L is a number of the simulated water conveyance channel and a is a maximum value of the system number;

S3.2, according to the attribute definition, judging whether a simulated water conveyance channel with the number L divides water from the upstream and automatically calculates the head-end water distribution or not, and if the simulated water conveyance channel with the number L divides water from the upstream and automatically calculates the water distribution, proceeding to step S3.3, and if the simulated water conveyance channel with the number L doesn't divide water from the upstream and cannot automatically calculate the water distribution, proceeding to step S3.7;

S3.3, according to the attribute definition, judging whether the simulated water conveyance channel with the number L is a tail-end canal channel or not, and if the simulated water conveyance channel with the number L is not a tail-end canal channel, calculating the tail-end water demand of the simulated water conveyance channel with the number L and then proceeding to step S3.4, and if the simulated water conveyance channel with the number L is a tail-end canal channel, proceeding to step S3.8;

S3.4, according to the attribute definition, judging whether the water usage manner along a way of the simulated water conveyance channel with the number L is tail-end water usage or not, and if the water usage manner along the way of the simulated water conveyance channel with the number L is tail-end water usage, proceeding to step S3.5, and if the water usage manner along the way of the simulated water conveyance channel with the number L is not tail-end water usage, proceeding to step S3.9;

S3.5, calculating a first consumption along the way based on the initial value of the water consumption demand, the seepage, the evaporation and the discharge of the simulated water conveyance channel with the number L, and then proceeding to step S3.6;

S3.6, calculating the head-end water demand of the simulated water conveyance channel with the number L based on the tail-end water demand and the consumption along the way of the simulated water conveyance channel with the number L, then calculating and updating a tail-end water distribution weight of the simulated water conveyance channel with the number L, and then proceeding to step S3.7;

S3.7, judging whether L=1 is established or not, if L=1 is established, proceeding to step S3.10, and if L=1 is not established, letting L=L−1 and then returning to step S3.2;

S3.8, calculating the head-end water demand of the simulated water conveyance channel with the number L based on the initial value of the water consumption demand of the simulated water conveyance channel with the number L, and then returning to step S3.7;

S3.9, calculating a second consumption along the way based on the initial value of the water consumption demand, the seepage, the evaporation and the discharge of the simulated water conveyance channel with the number L, and then proceeding to step S3.6;

S3.10, based on the attribute definition, judging whether it is established that the simulated water conveyance channel with the number L does not divide water from the upstream and the water distribution is not automatically calculated or not, and if it is established that the simulated water conveyance channel with the number L does not divide water from the upstream and the water distribution is not automatically calculated, proceeding to step S3.11, and if it is not established that the present simulated water conveyance channel with the number L does not divide water from the upstream and the water distribution is not automatically calculated, proceeding to step S3.12;

S3.11, based on the attribute definition, judging whether a tail end of the simulated water conveyance channel with the number L automatically divides water to other simulated water conveyance channels or not, and if the tail end of the simulated water conveyance channel with the number L automatically divides water to other simulated water conveyance channels, calculating and updating the tail-end water distribution weight of the simulated water conveyance channel with the number L according to a head-end water demand of a downstream simulated water conveyance channel of the simulated water conveyance channel with the number L, and then proceeding to step S3.12, and if the tail end of the simulated water conveyance channel with the number L doesn't automatically divide water to other simulated water conveyance channels, proceeding to step S3.12; and S3.12, judging whether L=a is established or not, and if L=a is established, ending; and if L=a is not established, letting L=L+1 and then returning to step S3.10.

4. The water supply simulation method of claim 3, wherein, a calculation formula of the tail-end water demand of the simulated water conveyance channel with the number L is:

$$QSDO = \sum_{m=1}^{N} QNDI_m$$

wherein QSDO is the tail-end water demand of the simulated water conveyance channel with the number L, N is a number of downstream channels (N>1); and $QNDI_m$ is a head-end water demand of an m-th downstream channel.

5. The water supply simulation method of claim 3, wherein, in step S3.5, a calculation formula of the first consumption along the way is:

Qcon=Qwdm+Qleak+Qet−Qdrain wherein Qcon is the first consumption along the way, Qwdm is an initial value of the water consumption demand of the simulated water conveyance channel with the number L, Qleak is a seepage of the simulated water conveyance channel with the number L, Qet is an evaporation loss of the simulated water conveyance channel with the number L, and Qdrain is a discharge of groundwater toward the simulated water conveyance channel with the number L.

6. The water supply simulation method of claim 3, wherein, in step S3.9, a calculation formula of the second consumption along the way is:

$$Qcon = \sum_{c=1}^{n} \max\left\{0, \left(\frac{Qwdm}{n} + Qleak_c + Qet_c - Qdrain_c\right)\right\}$$

wherein Qcon is the second consumption along the way, n is a total number of sections of the simulated water conveyance channel with the number L (n≥1), c is a c-th section of the simulated water conveyance channel with the number L (c≤n), Qwdm is an initial value of the water consumption demand of the simulated water conveyance channel with the number L, $Qleak_c$ is a seepage of the c-th section, $Qet_c$ is an evaporation loss of the c-th section, and $Qdrain_c$ is a discharge of groundwater to the c-th section.

7. The water supply simulation method of claim 3, wherein, in step S3.6, a calculation formula of the head-end water demand of the simulated water conveyance channel with the number L is:

QDI=QSDO+Qcon wherein QDI is the head-end water demand of the simulated water conveyance channel with the number L, QSDO is the tail-end water demand of the simulated water conveyance channel with the number L, and Qcon is the first consumption along the simulated water conveyance channel with the number L.

8. The water supply simulation method of claim 3, wherein, in step S3.8, a calculation formula of the head-end water demand of the simulated water conveyance channel with the number L is:

QDI=Qcon wherein QDI is the head-end water demand of the simulated water conveyance channel with the number L, and Qcon is first the consumption along the way of the simulated water conveyance channel with the number L.

9. A water supply simulation tool for an interlaced system of river system and canal system based on a groundwater model, comprising:

a receiving, constructing and assigning module for receiving first data of a research area, constructing a plurality of simulated water conveyance channels for the interlaced system of river system and canal system based on the first data, and constructing a topology structure based on the plurality of simulated water conveyance channels, then receiving attribute definitions of the plurality of simulated water conveyance channels, and assigning an initial value to a head-end water distribution of a head-end river channel and an initial values to a water consumption demand of each simulated water conveyance channel of the plurality of simulated water conveyance channels, wherein the each simulated water conveyance channel comprises a river channel and a canal channel;

a first acquisition module for acquiring an initial seepage, an initial evaporation and an initial discharge of the each simulated water conveyance channel according to the first data;

an initialization module for initializing a number of stress periods and a number of time periods;

a reverse water demand calculation module for performing a reverse water demand calculation based on the initial value of the water consumption demand, the first data, the attribute definition, the initial seepage, the initial evaporation and the initial discharge to obtain a head-end water demand of a head-end canal channel and tail end water distribution weights of the plurality of simulated water conveyance channels when a number of current time periods is less than or equal to a preset value of a number of time periods in the stress period and a number of current stress periods is less than or equal to a preset value of a number of stress periods;

a sequential water supply simulation module for performing a sequential water supply simulation based on the tail end water distribution weights, the initial value of the head-end water distribution of the head-end river channel and the head-end water demand of the head-end canal channel to obtain current seepage parameters, current discharge parameters, current evaporation parameters and current water consumption parameters of the plurality of simulated water conveyance channels;

a second acquisition module for constructing a matrix equation to obtain a corresponding water head according to the current seepage parameters, the current discharge parameters, the current evaporation parameters and the current water consumption parameters of the plurality of simulated water conveyance channels, and obtaining a current seepage, a current evaporation, a current discharge, a current head-end water demand and a current water consumption of the each simulated water conveyance channel according to the water head and a water balance equation;

a convergence judgment module for judging whether a current iteration is converged or not according to the water head;

an update module for updating the current seepage, the current evaporation and the current discharge of the each simulated water conveyance channel;

a time period and stress period counting judgment module for incrementing the number of the time periods by 1 each time the convergence judgment module judges that the result is converged, and judging whether the number of the current time periods is greater than the preset value of the number of the time periods in the stress period or not, and if the number of the current time periods is greater than the preset value of the number of the time periods in the stress period, setting the number of the time periods to 1 and then incrementing the number of the stress periods by 1, and judging whether the number of the current stress periods is greater than the preset value of the number of the stress periods or not; and an output module for outputting a result obtained from the water head and the water balance equation when the number of the current stress periods is greater than the preset value of the number of the stress periods.

10. A non-transitory computer-readable storage medium, comprising: a computer program, wherein the computer program is stored on the non-transitory computer-readable storage medium and when executed by a processor, the computer program implements the water supply simulation method of claim 1.

11. The non-transitory computer-readable storage medium of claim 10, wherein the attribute definition comprises: a system number, an upstream channel number, an upstream channel inflow, a downstream channel number, a diversion channel number, a water distribution attribute, a diversion manner, a head-end additional flow, a diversion ratio, a water consumption demand, a water usage manner, a tail-end water demand, a head-end water demand, a head-end water diversion, a calculated water level, a seepage, an evaporation and a discharge.

12. The non-transitory computer-readable storage medium of claim 11, wherein, the reverse water demand calculation comprises:

S3.1, letting L=a, wherein Lisa number of the simulated waterconveyance channel and a is a maximum value of the system number;

S3.2, according to the attribute definition, judging whether a simulated water conveyance channel with the number L divides water from the upstream and automatically calculates the head-end water distribution or not, and if the simulated water conveyance channel with the number L divides water from the upstream and automatically calculates the water distribution, proceeding to step S3.3, and if the simulated water conveyance channel with the number L doesn't divide water from the upstream and cannot automatically calculate the water distribution, proceeding to step S3.7;

S3.3, according to the attribute definition, judging whether the simulated water conveyance channel with the number L is a tail-end canal channel or not, and if the simulated water conveyance channel with the number L is not a tail-end canal channel, calculating the tail-end water demand of the simulated water conveyance channel with the number L and then proceeding to step S3.4, and if the simulated water conveyance channel with the number L is a tail-end canal channel, proceeding to step S3.8;

S3.4, according to the attribute definition, judging whether the water usage manner along a way of the simulated water conveyance channel with the number L is tail-end water usage or not, and if the water usage manner along the way of the simulated water conveyance channel with the number L is tail-end water usage, proceeding to step S3.5, and if the water usage manner along the way of the simulated water conveyance channel with the number L is not tail-end water usage, proceeding to step S3.9;

S3.5, calculating a first consumption along the way based on the initial value of the water consumption demand, the seepage, the evaporation and the discharge of the simulated water conveyance channel with the number L, and then proceeding to step S3.6;

S3.6, calculating the head-end water demand of the simulated water conveyance channel with the number L based on the tail-end water demand and the consumption along the way of the simulated water conveyance channel with the number L, then calculating and updating a tail-end water distribution weight of the simulated water conveyance channel with the number L, and then proceeding to step S3.7;

S3.7, judging whether L=1 is established or not, if L=1 is established, proceeding to step S3.10, and if L=1 is not established, letting L=L−1 and then returning to step S3.2;

S3.8, calculating the head-end water demand of the simulated water conveyance channel with the number L based on the initial value of the water consumption demand of the simulated water conveyance channel with the number L, and then returning to step S3.7;

S3.9, calculating a second consumption along the way based on the initial value of the water consumption demand, the seepage, the evaporation and the discharge of the simulated water conveyance channel with the number L, and then proceeding to step S3.6;

S3.10, based on the attribute definition, judging whether it is established that the simulated water conveyance channel with the number L does not divide water from the upstream and the water distribution is not automatically calculated or not, and if it is established that the simulated water conveyance channel with the number L does not divide water from the upstream and the water distribution is not automatically calculated, proceeding to step S3.11, and if it is not established that the present simulated water conveyance channel with the number L does not divide water from the upstream and the water distribution is not automatically calculated, proceeding to step S3.12;

S3.11, based on the attribute definition, judging whether a tail end of the simulated water conveyance channel with the number L automatically divides water to other simulated water conveyance channels or not, and if the tail end of the simulated water conveyance channel with the number L automatically divides water to other simulated water conveyance channels, calculating and updating the tail-end water distribution weight of the simulated water conveyance channel with the number L according to a head-end water demand of a downstream simulated water conveyance channel of the simulated water conveyance channel with the number L, and then proceeding to step S3.12, and if the tail end of the simulated water conveyance channel with the number L doesn't automatically divide water to other simulated water conveyance channels, proceeding to step S3.12; and S3.12, judging whether L=a is established or not, and if L=a is established, ending; and if L=a is not established, letting L=L+1 and then returning to step S3.10.

13. The non-transitory computer-readable storage medium of claim 12, wherein, a calculation formula of the tail-end water demand of the simulated water conveyance channel with the number L is:

$$QSDO = \sum_{m=1}^{N} QNDI_m$$

wherein QSDO is the tail-end water demand of the simulated water conveyance channel with the number L, N is a number of downstream channels (N≥1); and $QNDI_m$ is a head-end water demand of an m-th downstream channel.

14. The non-transitory computer-readable storage medium of claim 12, wherein, in step S3.5, a calculation formula of the first consumption along the way is:

Qcon=Qwdm+Qleak+Qet−Qdrain wherein Qcon is the first consumption along the way, Qwdm is an initial value of the water consumption demand of the simulated water conveyance channel with the number L, Qleak is a seepage of the simulated water conveyance channel with the number L, Qet is an evaporation loss of the simulated water conveyance channel with the number L, and Qdrain is a discharge of groundwater toward the simulated water conveyance channel with the number L.

15. The non-transitory computer-readable storage medium of claim 12, wherein, in step S3.9, a calculation formula of the second consumption along the way is:

$$Qcon = \sum_{c=1}^{n} \max\left\{0, \left(\frac{Qwdm}{n} + Qleak_c + Qet_c - Qdrain_c\right)\right\}$$

wherein Qcon is the second consumption along the way, n is a total number of sections of the simulated water conveyance channel with the number L (n≥1), c is a c-th section of the simulated water conveyance channel with the number L (c≤n), Qwdm is an initial value of the water consumption demand of the simulated water conveyance channel with the number L, $Qleak_c$ is a seepage of the c-th section, $Qet_c$ is an evaporation loss of the c-th section, and $Qdrain_c$ is a discharge of groundwater to the c-th section.

16. The non-transitory computer-readable storage medium of claim 12, wherein, in step S3.6, a calculation formula of the head-end water demand of the simulated water conveyance channel with the number L is:

QDI=QSDO+Qcon wherein QDI is the head-end water demand of the simulated water conveyance channel with the number L, QSDO is the tail-end water demand of the simulated water conveyance channel with the number L, and Qcon is the first consumption along the simulated water conveyance channel with the number L.

17. The non-transitory computer-readable storage medium of claim 12, wherein, in step S3.8, a calculation formula of the head-end water demand of the simulated water conveyance channel with the number L is:

QDI=Qcon wherein QDI is the head-end water demand of the simulated water conveyance channel with the number L, and Qcon is first the consumption along the way of the simulated water conveyance channel with the number L.

* * * * *